(12) United States Patent
Schrom et al.

(10) Patent No.: US 8,994,344 B2
(45) Date of Patent: Mar. 31, 2015

(54) MULTIPHASE TRANSFORMER FOR A MULTIPHASE DC-DC CONVERTER

(71) Applicant: Intel Corporation, Santa Clara, CA (US)

(72) Inventors: Gerhard Schrom, Hillsboro, OR (US); Peter Hazucha, Beaverton, OR (US); Jaeseo Lee, Los Angeles, CA (US); Tanay Karnik, Portland, OR (US); Vivek K. De, Beaverton, OR (US); Fabrice Paillet, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/727,227

(22) Filed: Dec. 26, 2012

(65) Prior Publication Data

US 2013/0113444 A1    May 9, 2013

Related U.S. Application Data

(63) Continuation of application No. 12/405,136, filed on Mar. 16, 2009, now Pat. No. 8,358,112, which is a continuation of application No. 11/173,065, filed on Jun. 30, 2005, now Pat. No. 7,504,808.

(51) Int. Cl.
　　*G05F 1/46*　　(2006.01)
　　*H02M 1/14*　　(2006.01)
　　*H02M 7/06*　　(2006.01)

(52) U.S. Cl.
　　CPC .............. *G05F 1/468* (2013.01); *H02M 1/14* (2013.01); *H02M 7/068* (2013.01)
　　USPC .......................... 323/247; 323/282; 323/284

(58) Field of Classification Search
　　USPC ................................................ 323/272, 247
　　See application file for complete search history.

(56) References Cited

U.S. PATENT DOCUMENTS

| | | | |
|---|---|---|---|
| 2,194,412 A | 3/1940 | Trabut | |
| 2,600,057 A | 6/1952 | Kerns | |
| 3,999,112 A | * 12/1976 | Gyugyi | ............................ 363/10 |
| 4,344,126 A | 8/1982 | Schumacher | |
| 4,470,090 A | 9/1984 | Carr | |

(Continued)

FOREIGN PATENT DOCUMENTS

| | | |
|---|---|---|
| EP | 1508958 | 2/2005 |
| JP | 1120046 | 5/1989 |
| TW | 20030218449 | 11/2003 |
| WO | WO-0217469 | 2/2002 |

OTHER PUBLICATIONS

International Application No. PCT/US2006/025712, filed on Sep. 30, 2004, whole document.

(Continued)

*Primary Examiner* — Thienvu Tran
*Assistant Examiner* — Tien Mai
(74) *Attorney, Agent, or Firm* — Blakely, Sokoloff, Taylor & Zafman LLP

(57) ABSTRACT

A multiphase DC-DC converter is provided that includes a multiphase transformer, the multiphase transformer including a plurality of input voltage terminals and an transformer output voltage terminal, each input voltage terminal associated with a corresponding phase. Each phase is assigned to an input voltage terminal of the plurality of input voltage terminals to minimize a ripple current at the input voltage terminals of the multiphase transformer.

18 Claims, 14 Drawing Sheets

(56) References Cited

U.S. PATENT DOCUMENTS

| | | | |
|---|---|---|---|
| 4,665,357 | A | 5/1987 | Herbert |
| 4,931,919 | A | 6/1990 | Nguyen |
| 5,070,440 | A | 12/1991 | Walker |
| 5,212,436 | A | 5/1993 | Nacewicz et al. |
| 5,726,849 | A | 3/1998 | Nakamura |
| 5,770,996 | A | 6/1998 | Severson et al. |
| 6,094,038 | A | 7/2000 | Lethellier |
| 6,262,566 | B1 | 7/2001 | Dinh |
| 6,275,919 | B1 | 8/2001 | Johnson |
| 6,281,666 | B1 | 8/2001 | Tressler et al. |
| 6,362,607 | B1 | 3/2002 | Wickersham et al. |
| 6,424,129 | B1 | 7/2002 | Lethellier |
| 6,545,450 | B1 | 4/2003 | Ledenev et al. |
| 6,600,296 | B2 | 7/2003 | Hazucha |
| 6,650,556 | B2 | 11/2003 | Dinh et al. |
| 6,686,727 | B2 | 2/2004 | Ledenev et al. |
| 6,694,438 | B1 | 2/2004 | Porter et al. |
| 6,696,823 | B2 | 2/2004 | Ledenev et al. |
| 6,757,184 | B2 | 6/2004 | Wei et al. |
| 6,784,644 | B2 | 8/2004 | Xu et al. |
| 6,789,246 | B1 | 9/2004 | Mohan et al. |
| 6,831,845 | B2 | 12/2004 | Biebach |
| 6,838,863 | B2 | 1/2005 | Hazucha et al. |
| 6,856,522 | B1 | 2/2005 | Wittenbreder |
| 6,879,138 | B2 | 4/2005 | Dinh et al. |
| 7,071,662 | B2 | 7/2006 | Hsu et al. |
| 7,075,821 | B2 | 7/2006 | Ye et al. |
| 7,109,689 | B2 | 9/2006 | Schneider et al. |
| 7,110,265 | B2 | 9/2006 | Liu et al. |
| 7,274,181 | B2 | 9/2007 | Schrom et al. |
| 7,315,463 | B2 | 1/2008 | Schrom et al. |
| 7,327,128 | B2 | 2/2008 | Dinh |
| 2002/0118000 | A1 | 8/2002 | Xu et al. |
| 2002/0180410 | A1 | 12/2002 | Brooks |
| 2003/0081438 | A1 | 5/2003 | Dinh et al. |
| 2003/0090246 | A1 | 5/2003 | Shenai et al. |
| 2003/0193791 | A1 | 10/2003 | Panella et al. |
| 2003/0218449 | A1* | 11/2003 | Ledenev et al. ............... 323/272 |
| 2004/0100805 | A1 | 5/2004 | Wei et al. |
| 2004/0114397 | A1 | 6/2004 | Liu et al. |
| 2004/0123171 | A1 | 6/2004 | Zhang et al. |
| 2004/0233690 | A1 | 11/2004 | Ledenev et al. |
| 2004/0263135 | A1 | 12/2004 | Dinh et al. |
| 2005/0040796 | A1 | 2/2005 | Sutardja |
| 2005/0040800 | A1 | 2/2005 | Sutardja |
| 2005/0093525 | A1 | 5/2005 | Walters et al. |
| 2005/0286280 | A1 | 12/2005 | Schrom et al. |
| 2006/0071649 | A1 | 4/2006 | Schrom et al. |
| 2006/0139015 | A1 | 6/2006 | Dinh et al. |
| 2006/0273872 | A1 | 12/2006 | Hazucha et al. |
| 2007/0097571 | A1 | 5/2007 | Dinh et al. |

OTHER PUBLICATIONS

Non-Final Office Action mailed Apr. 13, 2009 (TW Associate mail date May 15, 2009) for Taiwanese Patent Application No. 95123611.

Non-Final Office Action mailed Jan. 11, 2011 for U.S. Appl. No. 12/405,136.

Third Chinese Office Action mailed Mar. 8, 2011 for Chinese Patent Application No. 2006-80018297.8.

Final Office Action mailed May 6, 2011 for U.S. Appl. No. 12/405,136.

Notification of Grant mailed Jul. 5, 2011 for Chinese Patent Application No. 200680018297.8.

Amos, "Newnes Dictionary of Electronics," 1999, *Newnes*, Fourth Edition, 326-327.

CN PTO, "First Office Action," Chinese Application No. 200680018297.8, Mailed Mar. 5, 2009, whole document.

CN PTO, "Second Office Action", Chinese Application No. 200680018297.8, Mailed Apr. 2, 2010, whole document.

Li, J., et al., "Coupled-Inductor Design Optimization for Fast-Response Low Voltage DC-DC Converters," *IEEE Applied Power Electronics Conference*, Dallas Texas, Mar. 10-14, 2002.

Madden, George, "Powering High Performance ASICs and Microprocessors," *Maxim Integrated Products*, Feb. 1, 2003, *Reed Business Information* 2005.

Park, I. G., et al., "Modeling and Analysis of Multi-Phase Transformers for Connecting Power Converters in Parallel," *28th annual IEEE Power Elec. Spec. Conf.* 1997, 1164-1170.

Porter, Robert M., et al., "Method and Apparatus for Powering Low Voltage High Current Electronics," U.S. Appl. No. 60/144,342, filed Jul. 16, 1999, whole document.

Porter, Robert M., et al., "System for Controlling the Delivery of Power for Low Voltage, High Current Applications," U.S. Appl. No. 60/142,102, filed Jul. 2, 1999, whole document.

Thomas, Roland E., et al., "The Analysis and Design of Linear Circuits," *Chapter 7 Capacitance and Inductance; Section 7-5 Mutual Inductance*; Copyright 1994 by Prentice-Hall, Inc. A Paramount Communications Company, Englewood Cliffs, New Jersey 07632, pp. 368-369.

USPTO, "First Office Action," U.S. Appl. No. 12/405,136, Mailed Jan. 12, 2010, whole document.

USPTO, "Office Action," U.S. Appl. No. 10/956,192, filed Sep. 30, 2004, whole document.

Wei, J., "High Frequency High-Efficiency Voltage Regulators for Future Microprocessors," *Dissertation submitted to the faculty of the Virginia Polytechnic Institute and State University*, Blacksburg, Virginia, pp. i-xvi and 1-216 (Sep. 15, 2006).

Yao, K., et al., "A Family of Buck-Type DC-DC Converters with Autotransformers," *IEEE*, 2003, 114-120.

Yao, K., "High Frequency and High-Performance VRM Design for the next Generations of Processors," *Dissertation to the faculty of the Virginia Polytechnic Institute and State University*, Blacksburg Virginia, Apr. 14, 2004, i-x, 1-177.

Zumel, P., et al., "Magnetic Integration for Interleaved Converters," *Applied Power Electronics Conference and Exposition*, 2003, APEC '03, Eighteenth Annual IEEE vol. 2, Feb. 9-13, 2003, pp. 1143-1149.

Zumel, P., et al., "Tight Magnetic Coupling in Multi-Phase Interleaved Converters Based on Simple Transformers," *IEEE Applied Power Electronics Conference*, Austin Texas, Mar. 6-10, 2005.

* cited by examiner

MULTIPHASE DC-DC
CONVERTER
100

CYCLIC CASCADE
200

MODIFIED CYCLIC
CASCADE
400

MIXED CYCLIC
CASCADE
600

MIXED CYCLIC CASCADE
(5 PHASES)
650

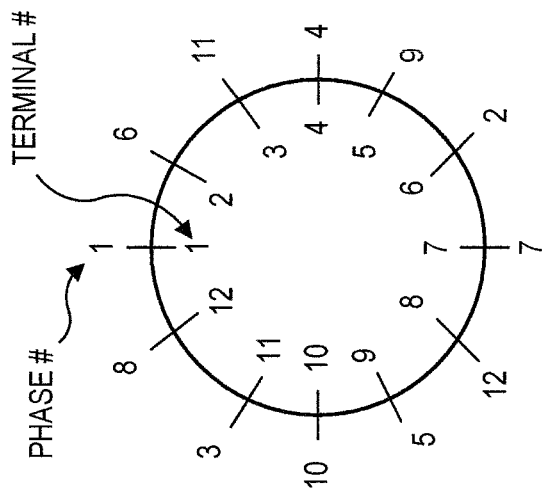
FIG. 9B  N = 12 PHASES
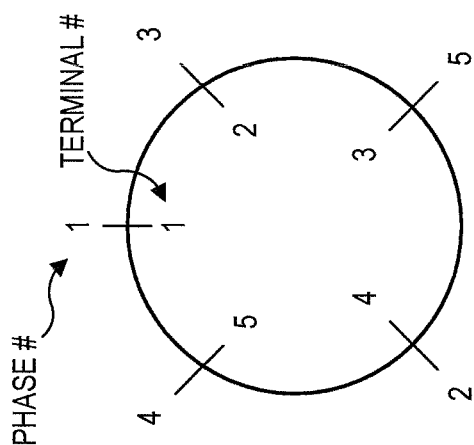
FIG. 9A  N = 5 PHASES

MULTIPHASE TRANSFORMER FOR A MULTIPHASE DC-DC CONVERTER

CLAIM OF PRIORITY

The present application is a Continuation of, and claims priority to and incorporates by reference in its entirety, the corresponding U.S. patent application Ser. No. 11/173,065 filed Jun. 30, 2005, and entitled "Multiphase Transformer For A Multiphase DC-DC Converter," and issued as U.S. Pat. No. 7,504,808 on Mar. 17, 2009, and is a Continuation of, and claims priority to and incorporates by reference, the corresponding co-pending U.S. patent application Ser. No. 12/405,136 filed Mar. 16, 2009, and entitled "Multiphase Transformer For A Multiphase DC-DC Converter."

BACKGROUND

1. Field

Embodiments of the invention relate to the field of power converters and more specifically, but not exclusively, to a multiphase transformer for a multiphase DC-DC converter.

2. Background Information

Direct Current to Direct Current (DC-DC) converters are able to convert energy from a power supply from one voltage and current level to another voltage and current level. DC-DC converters are utilized in conjunction with various computing systems such as desktop, servers, and home electronics. DC-DC converters may also be found in mobile computer systems such as laptops, mobile phones, personal digital assistants, and gaming systems.

Today's microprocessors may consume 100-200 Watts of power. A DC-DC converter may be used to provide power to a processor that requires low voltages, such as 0.5 to 2.0 volts (V), and high currents, such as 100 amperes (A) or more. Further, the current demands of processors may change over a relatively wide range with a relatively high slew rate.

Multiphase DC-DC converters may be used to provide the high-current low-voltage demands of computing systems. Today's multiphase DC-DC converters may use discrete-inductor topologies, which require large filter capacitances and may not be suitable for monolithic integration. Other multiphase DC-DC converters may include multiphase transformer topologies that fail to maximize the efficiency of the DC-DC converter. Also, such multiphase DC-DC converters fail to take into account the order that phases are assigned to the multiphase transformer.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 9A is a diagram illustrating the assignment of phases to a multiphase transformer in accordance with one embodiment of the present invention.

FIG. 9B is a diagram illustrating the assignment of phases to a multiphase transformer in accordance with one embodiment of the present invention.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "one embodiment" or "an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Figure 1A:
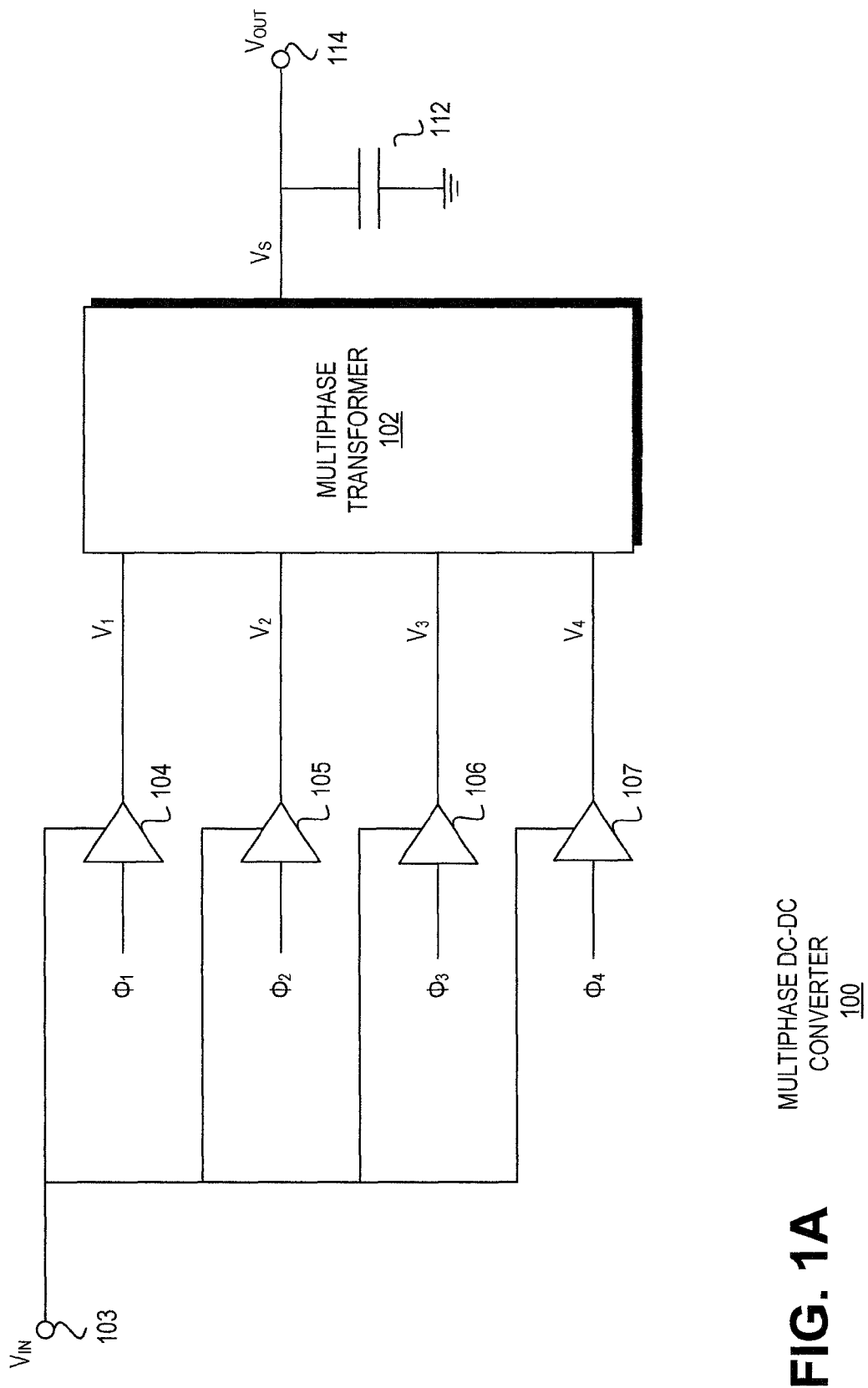
FIG. 1A is a block diagram illustrating a multiphase DC-DC converter in accordance with one embodiment of the present invention.

Turning to FIG. 1A, an embodiment of a multiphase DC-DC converter 100 is shown. Multiphase DC-DC converter 100 may also be referred to as a Multiphase Voltage Regulator Module (VRM) in the relevant art. In one embodiment, multiphase DC-DC converter 100 is an integrated on-die device, Multiphase DC-DC converter 100 includes a multiphase transformer 102 in accordance with embodiments described herein. Various embodiments of multiphase transformer 102 will be described below.

Multiphase DC-DC converter 100 receives an input voltage $V_{IN}$ at terminal 103. The input voltage is applied to bridge 104, 105, 106, and 107. Each bridge also receives a corresponding control signal ($\Phi_1$-$\Phi_4$). In one embodiment, switch control of the bridges 104-107 uses pulse-width modulation (PWM). While FIG. 1A shows a multiphase DC-DC converter with four phases, it will be understood that embodiments of the invention are not limited to a multiphase transformer having four phases.

In general, the phases are shifted by a multiple of 360/N degrees, where N is the number of phases. For example, in FIG. 1B, the four phases N of multiphase DC-DC converter 100 are shifted by multiples of 90 degrees, e.g., 90, 180, and 270 degrees. Transformer output voltage $V_S$ has a residual ripple voltage (and corresponding ripple current) due to the switching of the bridges. In one embodiment, a capacitor is used to minimize this ripple voltage.

Each bridge 104-107 outputs a voltage $V_1$-$V_4$, respectively, that is applied to corresponding terminals of multiphase transformer 102. Voltages $V_1$-$V_4$ are the switching PWM waveforms according to the control signals ($\Phi_1$-$\Phi_4$). The assignment of phases to the bridge inputs for the control signals corresponds to the assignment of phases to the input terminals of the multiphase transformer 102. The assignment of phases determines the phase shift for each transformer input terminal.

Multiphase transformer 102 produces a transformer output voltage $V_S$. Voltage $V_S$ is filtered by capacitor 112 to provide output voltage $V_{OUT}$ of multiphase DC-DC converter 100 at terminal 114. Furthermore, capacitor 112 stabilizes output voltage $V_{OUT}$ in the event of a sudden change of the load current. The required size of capacitor 112 may be reduced by increasing the number of phases and by increasing the coupling factor of the multiphase transformer.

In accordance with embodiments herein, phases are assigned to multiphase transformer 102 in an order to increase DC-DC convener efficiency. Converter efficiency is a ratio of the power output to the power input of the converter. Some loss occurs as the DC-DC convener converts electrical power from the input voltage level to the desired output voltage level.

Figure 1B:
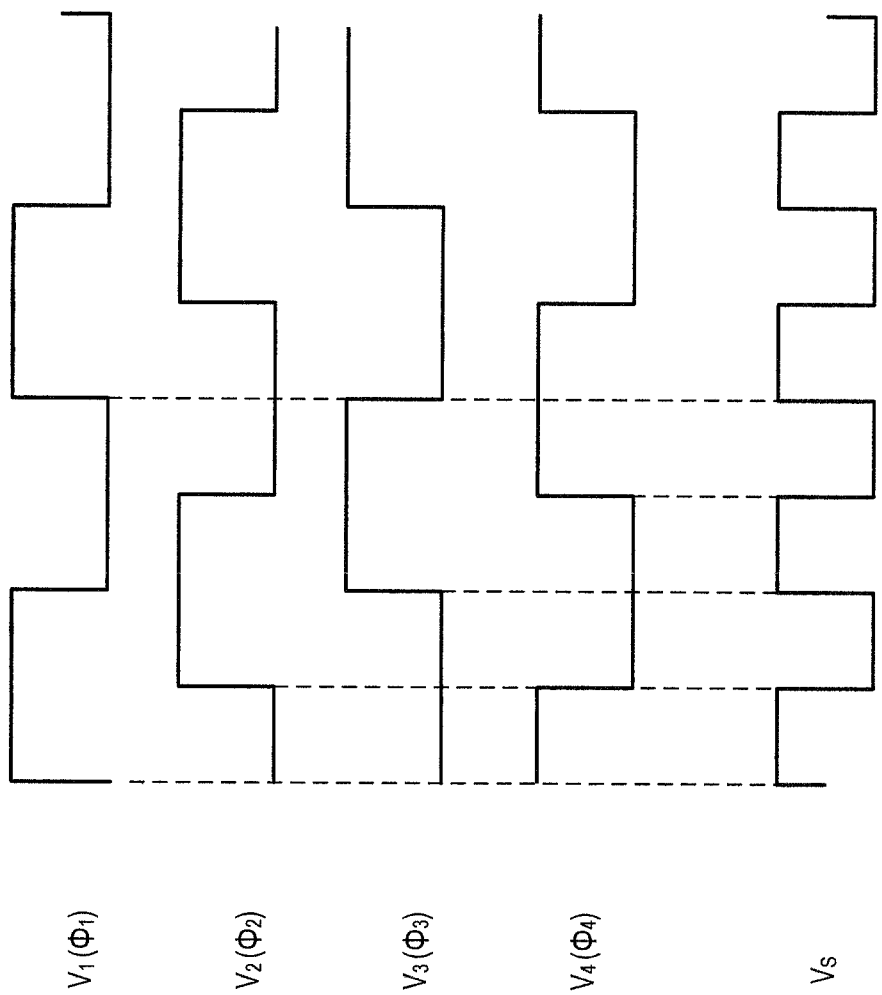
FIG. 1B is a diagram illustrating voltage waveforms of a multiphase DC-DC converter in accordance with one embodiment of the present invention.

The assignment of phases sequentially to multiphase transformer 102, as shown in the example of FIG. 1B, leads to lower convener efficiency due to high ripple currents at the transformer input voltage terminals. The efficiency degradation can be several percentage points below 90%. The assignment of phases as described herein leads to DC-DC converter efficiencies of 90% or higher.

Embodiments of multiphase transformer 102 will now be discussed. It will be understood that embodiments of the invention are not limited to these multiphase transformer embodiments. Also, the multiphase transformers are not limited to the number of phases as described. The multiphase transformers may be scaled to the number of phases as appropriate for the implementation.

Figure 2:
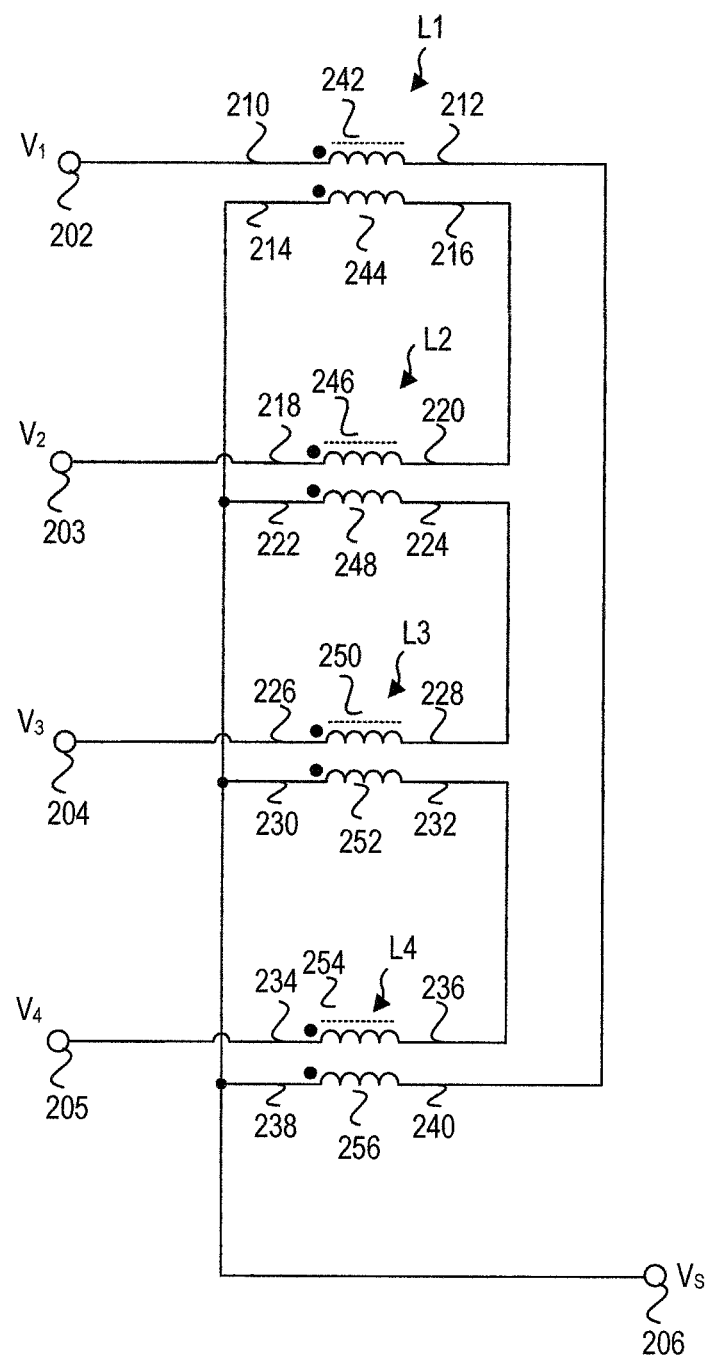
FIG. 2 is a circuit diagram illustrating a cyclic cascade multiphase transformer in accordance with one embodiment of the present invention.

Referring to FIG. 2, an embodiment of a multiphase transformer 200 is shown. Multiphase transformer 200 uses a cyclic cascade topology. Multiphase transformer 200 includes four 2-phase transformers. In the embodiment of FIG. 2, the four 2-phase transformers are implemented as coupled inductors, L1-L4.

In one embodiment, the coupled inductors include two inductors magnetically coupled. The windings of the two inductors are made about the same core. As shown by the dot notation, the two inductors are wound with the same polarity and are directly coupled (as opposed to indirectly coupled). The number of windings of each inductor are the same (1:1 ratio). The dotted bar over coupled inductors L1-L4 indicates a magnetic core. In one embodiment, the inductors are integrated inductors on a semiconductor die.

Voltages $V_1$-$V_4$ are inputted to input voltage terminals 202-205, respectively. Transformer output voltage Vs at output terminal 206 is approximately $V_S=(V_1+V_2+V_3+V_4)/4=(V_1+\ldots V_N)/N$, even in the presence of large currents at any of the transformer terminals.

Input voltage terminal 202 is coupled to terminal 210 of inductor 242 of coupled inductors L1. Terminal 212 of inductor 242 is coupled to terminal 240 of inductor 256 of coupled inductor L4. Terminal 214 of inductor 244 of coupled inductors L1 is coupled to transformer output voltage $V_S$ terminal 206. Terminal 216 of inductor 244 of coupled inductors L1 is coupled to terminal 220 of inductor 246 of coupled inductors L2.

Input voltage terminal 203 is coupled to terminal 218 of inductor 246 of coupled inductors L2. Terminal 222 of inductor 248 of coupled inductors L2 is coupled to transformer output voltage $V_S$ terminal 206. Terminal 224 of inductor 248 of coupled inductors L2 is coupled to terminal 228 of inductor 250 of coupled inductors L3.

Input voltage terminal 204 is coupled to terminal 226 of inductor 250 of coupled inductors L3. Terminal 230 of inductor 252 of coupled inductors L3 is coupled to transformer output voltage $V_S$ terminal 206. Terminal 232 of inductor 252 of coupled inductors L3 is coupled to terminal 236 of inductor 254 of coupled inductors L4.

Input voltage terminal 205 is coupled to terminal 234 of inductor 254 of coupled inductors L4. Terminal 238 of inductor 256 of coupled inductors L4 is coupled to transformer output voltage $V_S$ terminal 206. And as described earlier, terminal 240 of inductor 256 of coupled inductors L4 is coupled to terminal 212 of inductor 242 of coupled inductors L1.

Figure 3:
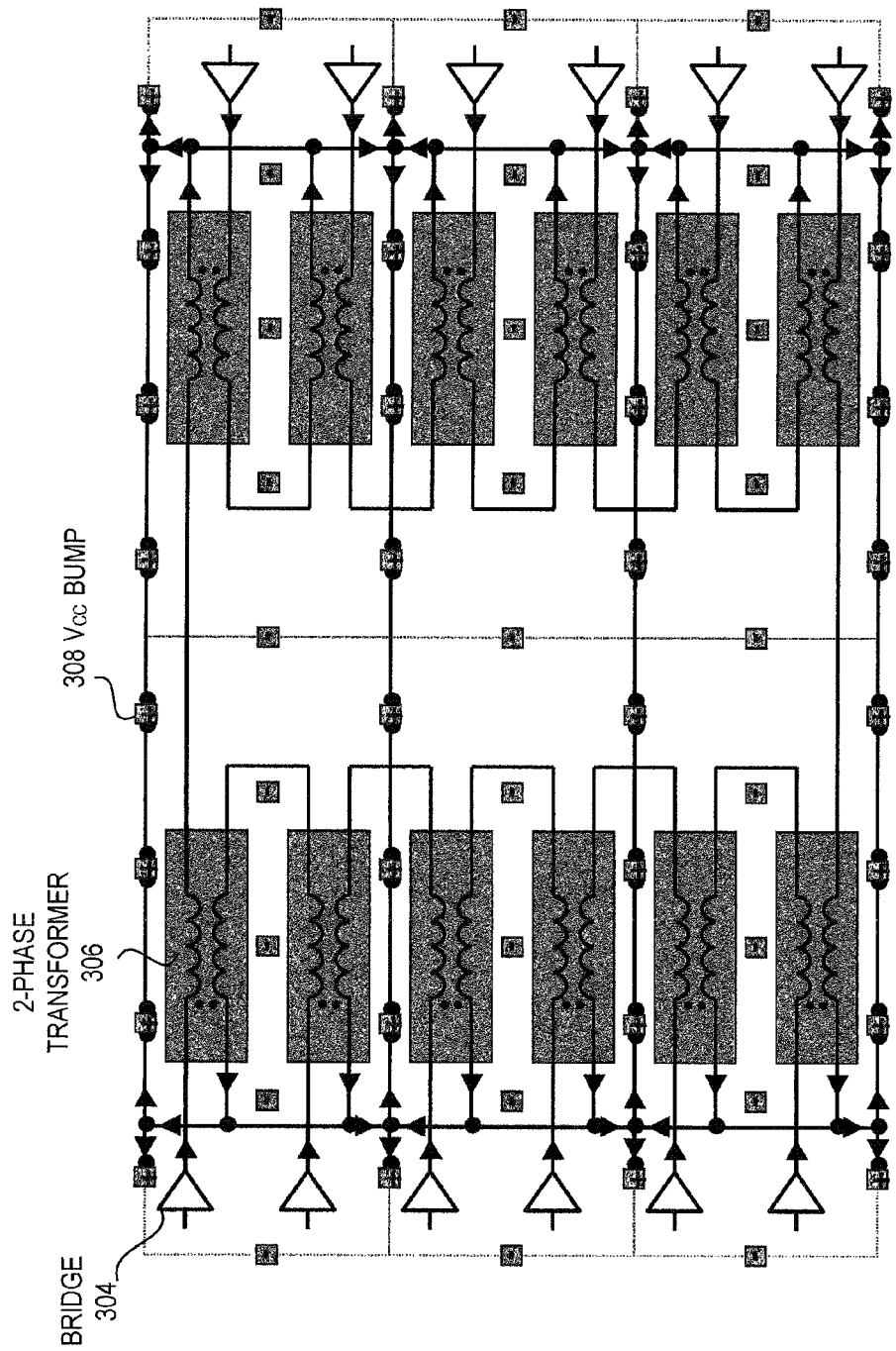
FIG. 3 is a circuit diagram illustrating a DC-DC converter floor plan using a cyclic cascade multiphase transformer in accordance with one embodiment of the present invention.

Turning to FIG. 3, an embodiment of a floor plan of an on-die or monolithic 12-phase DC-DC converter 300 using a multiphase transformer having cyclic cascade topology is shown. DC-DC converter 300 includes 12 two-phase transformers, such as two-phase transformer 306. The two-phase transformers are arranged in two columns so as to minimize the parasitic resistance of the connections between the transformers. The bridges, such as bridge 304, are arranged in two columns on either side of the DC-DC converter 300. The transformers deliver the output current to the $V_{CC}$ bumps, such as $V_{CC}$ bump 308. The $V_{CC}$ bumps are shown by "+" symbols in FIG. 3. The $V_{CC}$ bumps may be connected to a consumer circuit, such as a processor.

Figure 4:
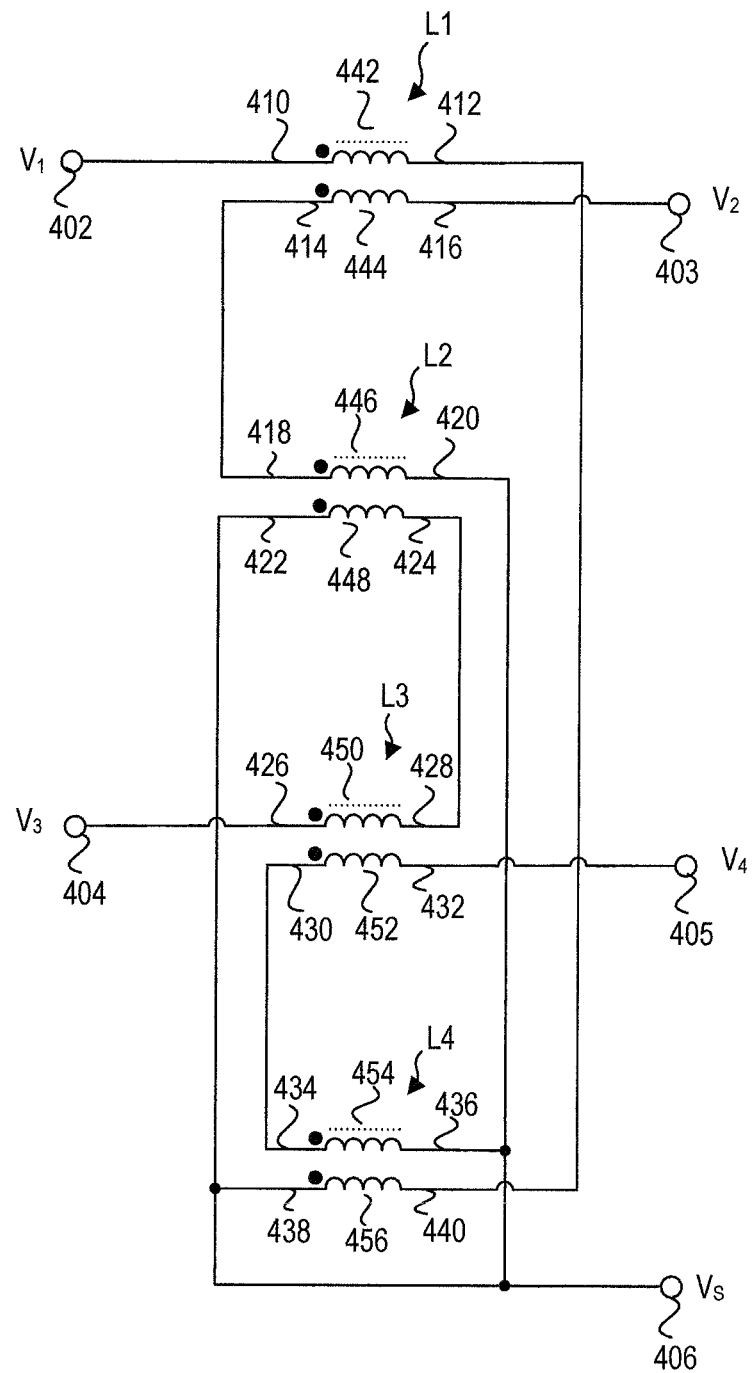
FIG. 4 is a circuit diagram illustrating a modified cyclic cascade multiphase transformer in accordance with one embodiment of the present invention.

Referring to FIG. 4, an embodiment of a multiphase transformer 400 is shown. Multiphase transformer 400 uses a modified cyclic cascade topology. Voltages $V_1$-$V_4$ are inputted to input voltage terminals 402-405, respectively. Transformer output voltage $V_S$ at output terminal 406 is approximately $V_S=(V_1+V_2+V_3+V_4)/4(V_1+\ldots V_N)/N$, even in the presence of large currents at any of the transformer terminals.

Input voltage terminal 402 is coupled to terminal 410 of inductor 442 of coupled inductors L1. Terminal 412 of inductor 442 is coupled to terminal 440 of inductor 456 of coupled inductors L4. Terminal 416 of inductor 444 of coupled inductors L1 is coupled to input voltage terminal 403. Terminal 414 of inductor 444 is coupled to terminal 418 of inductor 446 of coupled inductors L2.

Terminal 420 of inductor 446 of coupled inductors L2 is coupled to transformer output voltage $V_S$ terminal 406. Terminal 422 of inductor 448 of coupled inductors L2 is coupled to transformer output voltage $V_S$ terminal 406. Terminal 424 of inductor 448 is coupled to terminal 428 of inductor 450 of coupled inductors L3.

Input voltage terminal 404 is coupled to terminal 426 of inductor 450 of coupled inductors L3. Terminal 430 of inductor 452 of coupled inductors L3 is coupled to terminal 434 of inductor 454 of coupled inductors L4. Terminal 432 of inductor 452 is coupled to input voltage terminal 405.

Terminal 436 of inductor 454 is coupled to transformer output voltage $V_S$ terminal 406. Terminal 438 of inductor 456 of coupled inductors L4 is coupled to transformer output voltage $V_S$ terminal 406. And as described above, terminal 440 of inductor 456 is coupled to terminal 412 of inductor 442 of coupled inductors L1.

Figure 5:
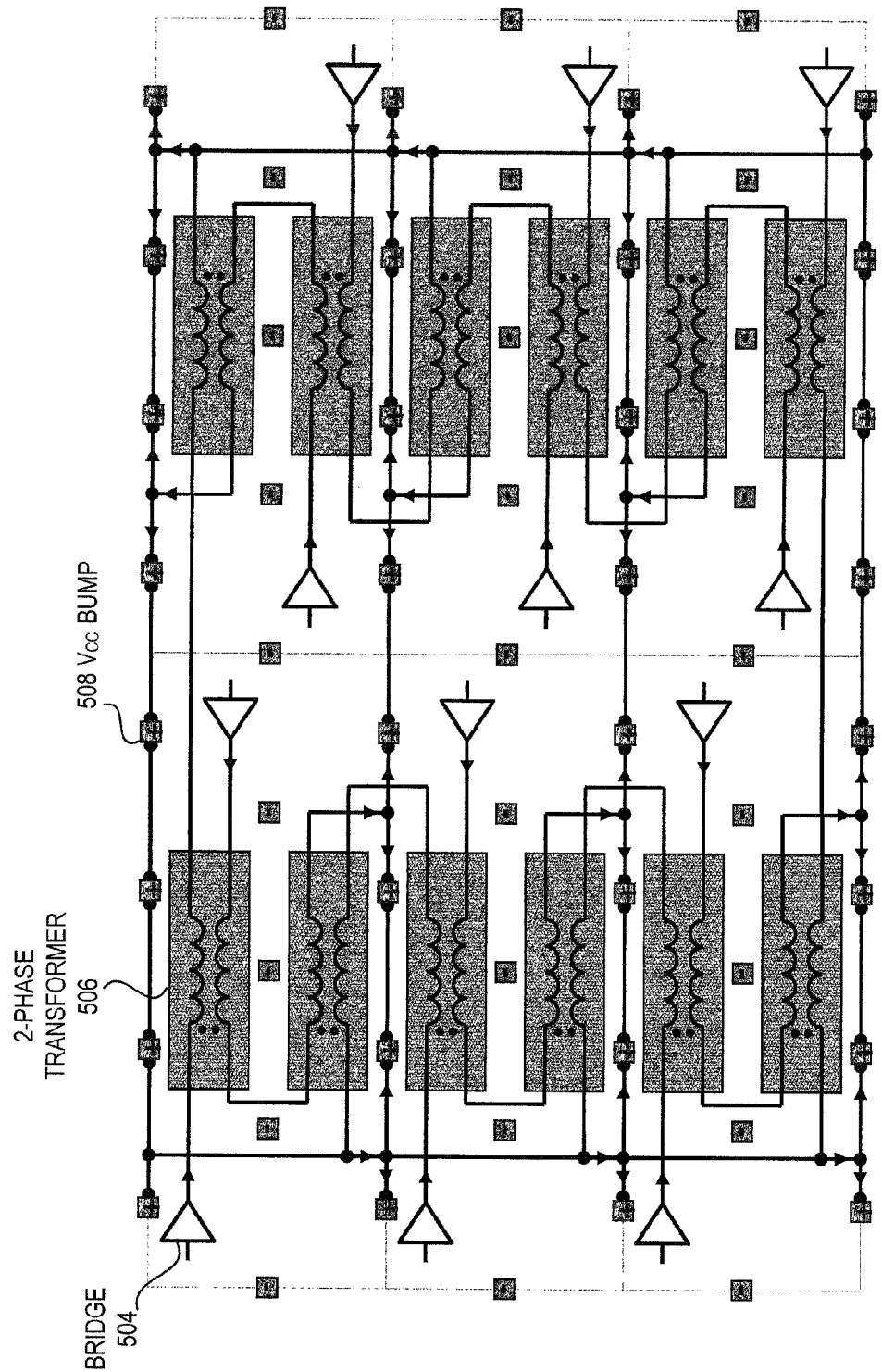
FIG. 5 is a circuit diagram illustrating a DC-DC converter floor plan using a modified cyclic cascade multiphase transformer in accordance with one embodiment of the present invention.

Turning to FIG. 5, an embodiment of a floor plan of an on-die or monolithic 12-phase DC-DC converter 500 using a multiphase transformer having modified cyclic cascade topology is shown. DC-DC converter 500 includes 12 two-phase transformers, such as two-phase transformer 506. The two-phase transformers are arranged in two columns so as to minimize the parasitic resistance of the connections between the transformers. The bridges, such as bridge 504, are spread out between the transformer columns. The transformers deliver the output current to the $V_{CC}$ bumps, such as $V_{CC}$ bump 508, shown by the "+" symbols in FIG. 5. The $V_{CC}$ bumps may be connected to a consumer circuit, such as a processor.

In the 12-phase DC-DC converter 500, the output current is delivered to the $V_{CC}$ bumps more evenly as compared to the floor plan in FIG. 3. In FIG. 3, the output current is delivered predominately to the $V_{CC}$ bumps on the left and right edges of the converter block, which could overstress these humps and leaves the bumps in the center with higher parasitic resistance. This higher parasitic resistance leads to lower efficiency and worse transient voltage droop performance.

Further, in converter 500, transformer outputs and bridges don't compete for as much metal density since they are not in the same area, as compared to converter 300. This also leads to lower parasitic resistance in converter 500.

Thus, converter 500 has lower parasitic resistance, and hence higher efficiency, as compared to converter 300. Converter 500 also has better transient voltage droop performance and lower thermal stress.

Figure 6A:
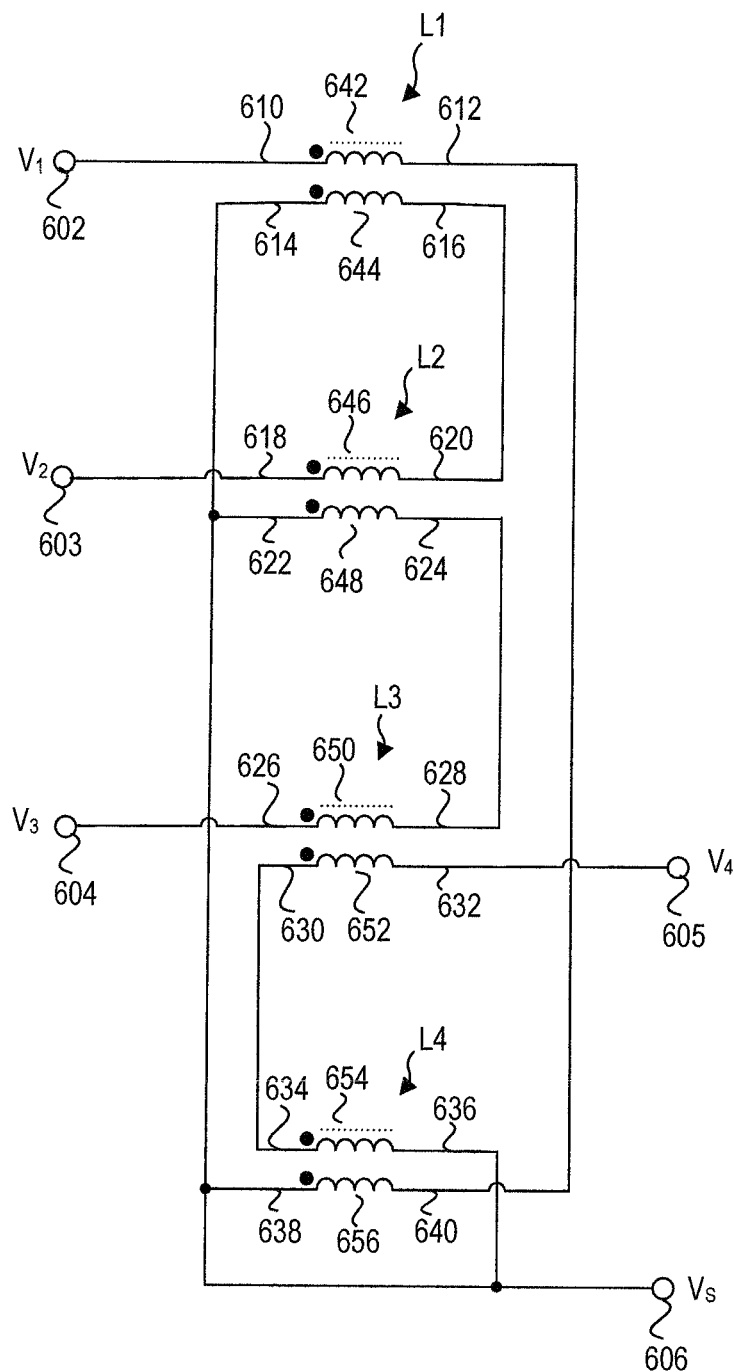
FIG. 6A is a circuit diagram illustrating a mixed cyclic cascade multiphase transformer in accordance with one embodiment of the present invention.

Referring to FIG. 6A, an embodiment of a multiphase transformer 600 is shown. Multiphase transformer 600 has a mixed cyclic cascade topology. Multiphase transformer 600 includes four 2-phase transformers. In the embodiment of FIG. 6A, the four 2-phase transformers are implemented as coupled inductors, L1-L4. Voltages $V_1$-$V_4$ are inputted to input voltage terminals 602-605, respectively. Transformer output voltage $V_S$ at output terminal 606 is approximately $V_S=(V_1+V_2+V_3+V_4)/4(V_1+\ldots V_N)/N$, even in the presence of large currents at any of the transformer terminals.

Input voltage terminal 602 is coupled to terminal 610 of inductor 642 of coupled inductors L1. Terminal 612 of inductor 642 is coupled to terminal 640 of inductor 656 of coupled inductors L4. Terminal 616 of inductor 644 is coupled to terminal 620 of inductor 646 of coupled inductors L2. Terminal 614 of coupled inductors L1 is coupled to transformer output voltage $V_S$ terminal 606.

Input voltage terminal 603 is coupled to terminal 618 of inductor 646 of coupled inductors L2. Terminal 622 of inductor 648 of coupled inductors L2 is coupled to transformer output voltage $V_S$ terminal 606. Terminal 624 of inductor 648 is coupled to terminal 628 of inductor 650 of coupled inductors L3.

Input voltage terminal 604 is coupled to terminal 626 of inductor 650 of coupled inductors L3. Input voltage terminal 605 is coupled to terminal 632 of inductor 652 of coupled inductors L3. Terminal 630 of inductor 652 of coupled inductors L3 is coupled to terminal 634 of inductor 654 of coupled inductors L4.

Terminal 636 of inductor 654 is coupled to transformer output voltage $V_S$ terminal 606. Terminal 638 of inductor 656 of coupled inductors L4 is coupled to transformer output voltage $V_S$ terminal 606. And as described above, terminal 640 of inductor 656 is coupled to terminal 612 of inductor 642 of coupled inductors L1.

In the mixed cyclic cascade 600, coupled inductors L1 and L2 are arranged as part of a cyclic cascade (as shown in FIG. 2), whereas coupled inductors L3 and L4 are arranged as part of a modified cyclic cascade (as shown in FIG. 4). In one embodiment of a mixed cyclic cascade topology, one or more parts may be in a cyclic cascade arrangement, while the majority may be in a modified cyclic cascade arrangement.

In one embodiment, the mixed cyclic cascade topology may have an odd number of phases, which may result in higher efficiency. In general, a modified cyclic cascade is used with an even number of phases, and usually not an odd number of phases. A modified cyclic cascade with an even number of phases may have better efficiency than a (regular) cyclic cascade with an odd number of phases. This is due to the routing congestion incurred by the (regular) cyclic cascade. The mixed cyclic cascade may provide both: an odd number of phases and no routing congestion.

Figure 6B:
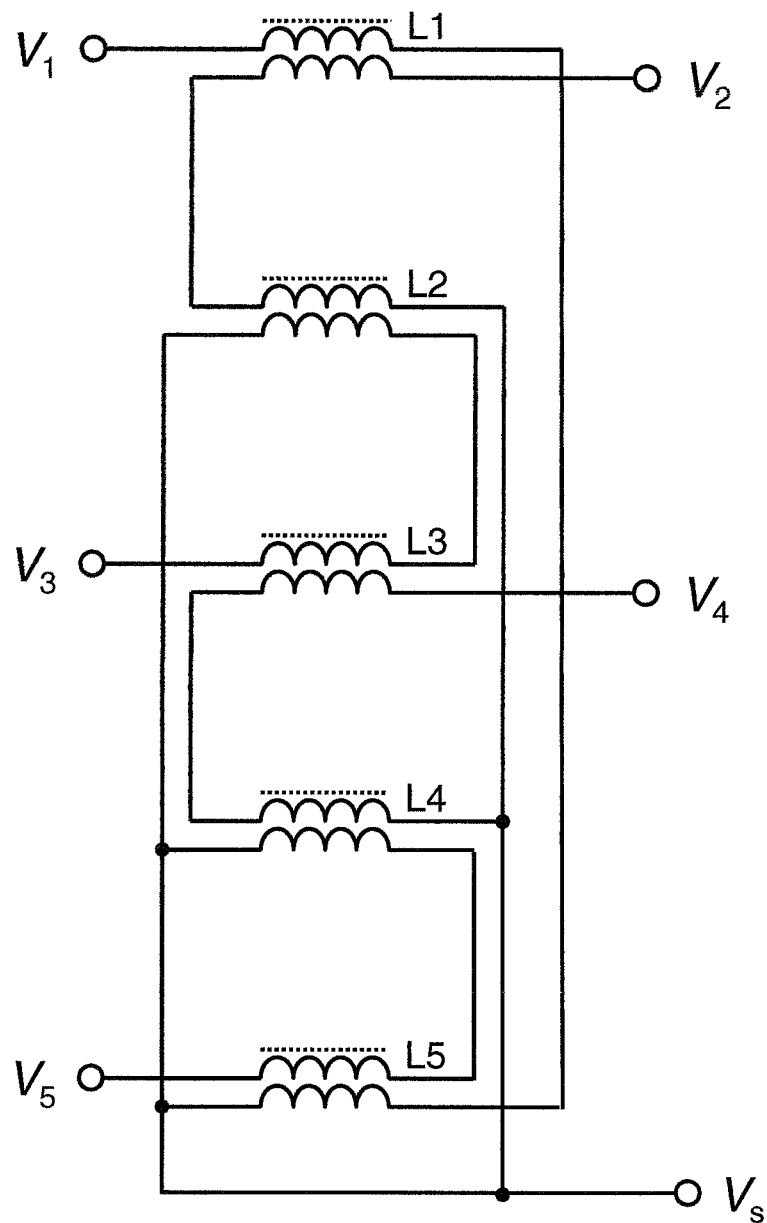
FIG. 6B is a circuit diagram illustrating a mixed cyclic cascade multiphase transformer in accordance with one embodiment of the present invention.

Turning to FIG. 6B, an embodiment of a multiphase transformer 650 using a mixed cyclic topology having an odd number of phases is shown. Multiphase transformer 650 includes five 2-phase transformers. Each 2-phase transformer is implemented as coupled inductors, shown as L1-L5. In a mixed cyclic cascade topology with an odd number of phases: coupled inductors L1-L4 are arranged as part of a modified cyclic cascade, whereas coupled inductors L5 are arranged as part of a (regular) cyclic cascade.

Figure 7:
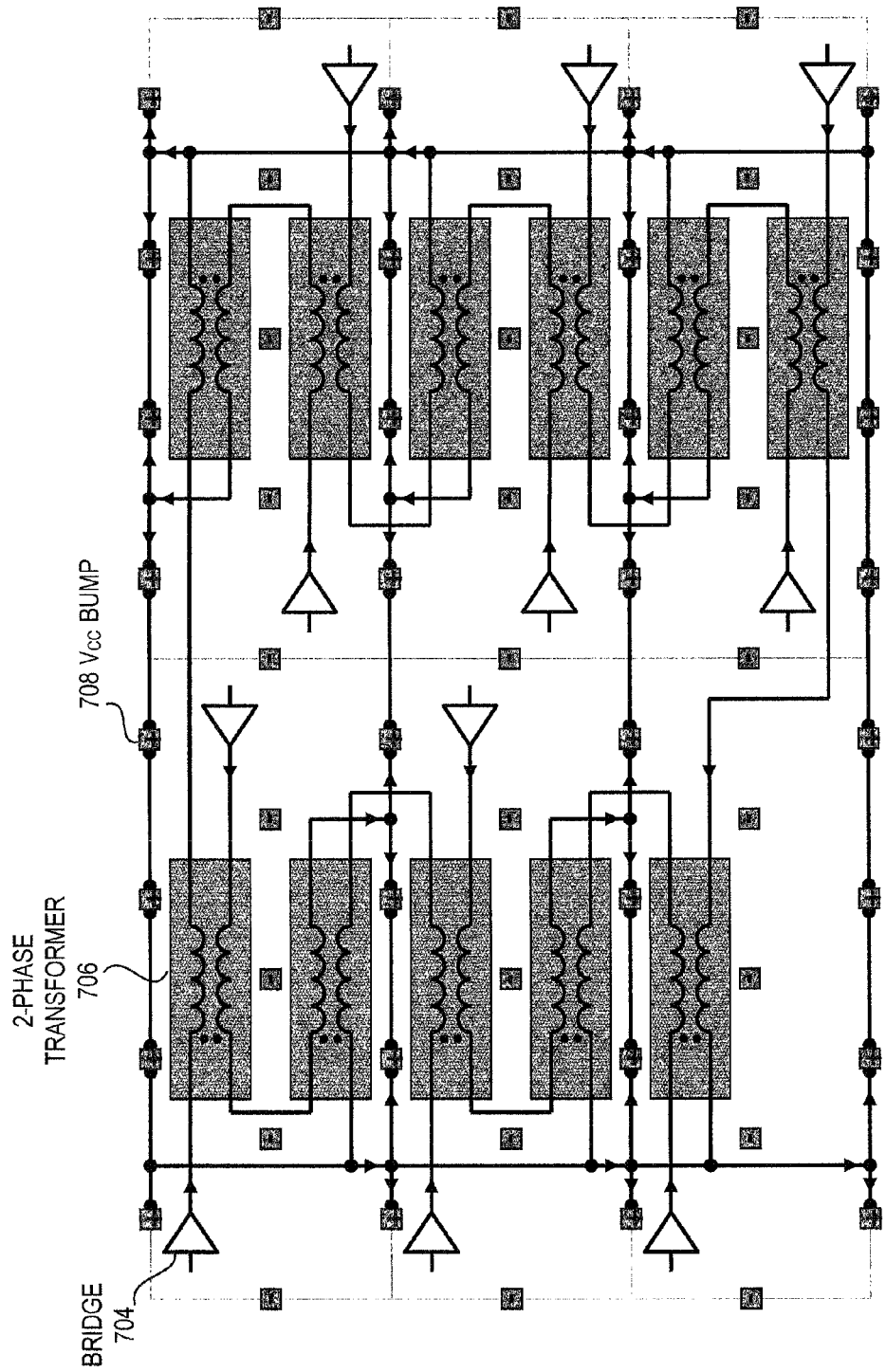
FIG. 7 is a circuit diagram illustrating a DC-DC converter floorplan using a mixed cyclic cascade multiphase transformer in accordance with one embodiment of the present invention.

Turning to FIG. 7, an embodiment of a floor plan for an on-die or monolithic 11-phase DC-DC converter 700 using a multiphase transformer having a mixed cyclic cascade topology is shown. DC-DC converter 700 includes 11 two-phase transformers, such as two-phase transformer 706. The two-phase transformers are arranged in two columns so as to minimize the parasitic resistance of the connections between the transformers. The bridges, such as bridge 704, are spread out between the transformer columns. The transformers deliver the output current to the $V_{CC}$ bumps, such as $V_{CC}$ bump 708, shown by the "+" symbols in FIG. 7. The $V_{CC}$ bumps may be connected to a consumer circuit, such as a processor.

Figure 8:
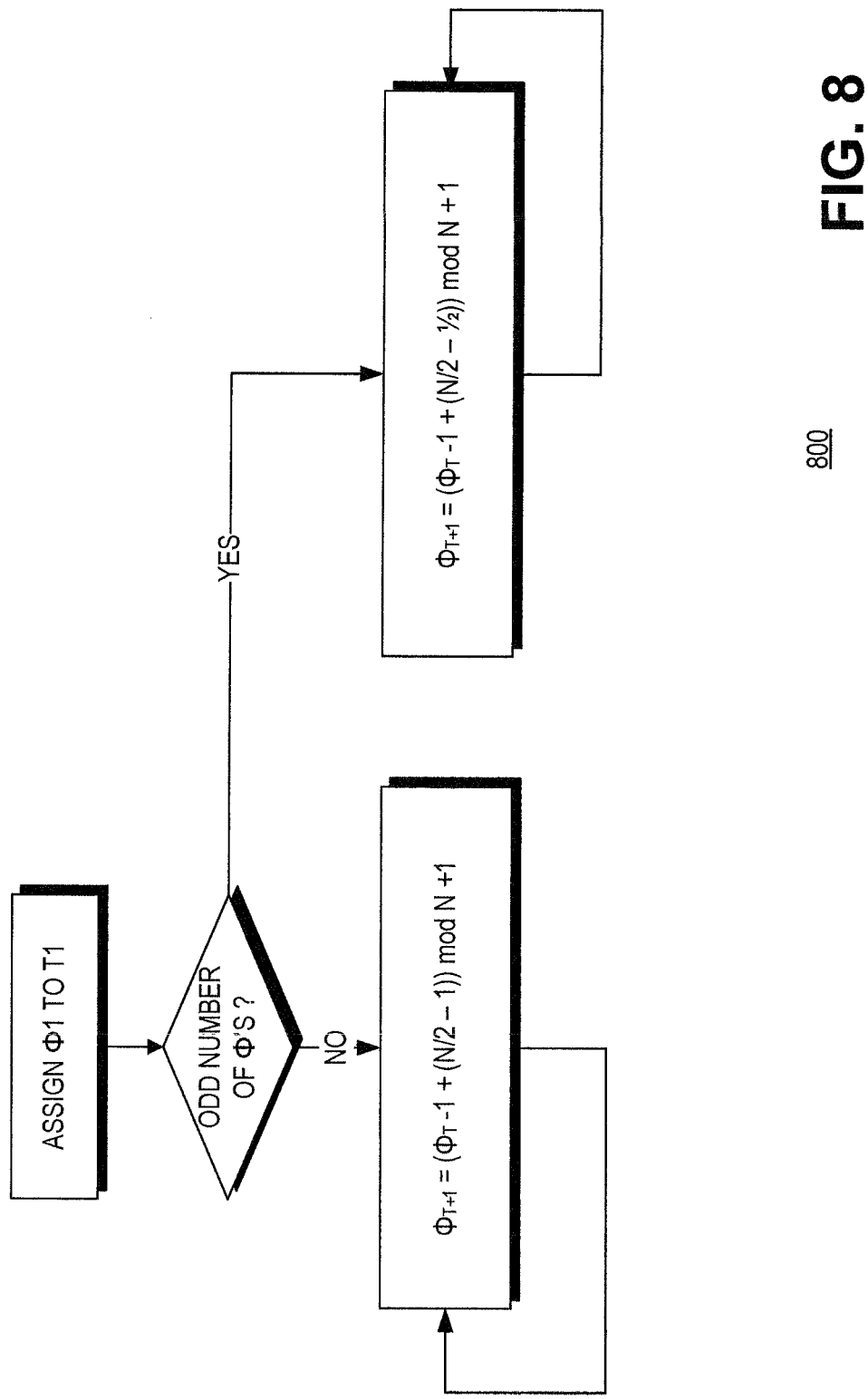
FIG. 8 is a flowchart illustrating the logic and operations to assign phases to a multiphase transformer in accordance with one embodiment of the present invention.

Turning to FIGS. 8, 9A and 9B, the assignment of phases to a multiphase transformer in accordance with embodiments of the present invention are shown. While embodiments of a multiphase transformer topology, as discussed above, provide the advantages of a multiphase transformer, that is, small output inductance and large input inductance, the actual value of the input inductance, and therefore the ripple current at the input terminals, depends on the order in which the phases are assigned to the input terminals of the multiphase transformer.

In an ideal multiphase transformer, the ripple current of individual windings will be a perfectly symmetrical triangular waveform, and thus, the order in which the phases are assigned the input terminals of the multiphase transformer would not matter. However, such an ideal multiphase transformer is not practically feasible. In one embodiment, an ideal multiphase transformer is approximated with combinations of two-phase transformers as described above in conjunction with FIGS. 2-7.

In one embodiment, the phases are assigned to the multiphase transformer to minimize the ripple current at the input of the multiphase transformer. The assignment of phases to the voltage input terminals of the multiphase transformer impacts the shape and effective amplitude of the ripple current that passes through the windings, and consequently, the efficiency of the multiphase DC-DC converter. The assignment of phases described below closely approximates an ideal situation keeping the input ripple current small. The phase assignment affects the input ripple current, part of which comes from the magnetization change of the core. The output ripple current is essentially independent of the phase assignment.

An embodiment for assignment of phases is as follows. Let N=number of phases, $\Phi_T$=the phase assigned to terminal T, with an angle A=360*($\Phi_T$−1)/N. Assign phase $\Phi_1$=1 to the first terminal, T1. Assign phases $\Phi_T$ to the other terminals T=2 ... N such that the phases are equally spaced and the phase differences 360*($\Phi_{T+1}$−$\Phi_T$)/N are as close as possible to 180+n*360, where n is an arbitrary integer. This can be achieved by finding the closest integer m=($\Phi_{T+1}$−$\Phi_T$)<(N/2) such that N is not a multiple of m. Note that if m is a solution, then so is N−m.

An embodiment of the above algorithm, shown by flowchart 800 in FIG. 8, is as follows:

$$\Phi_1 = 1;$$

$$\Phi_{T+1} = (\Phi_T - 1 + (N/2 - 1/2)) \bmod N + 1,$$
where $N$ is odd number of phases
$$= (\Phi_T - 1 + (N/2 - 1)) \bmod N + 1,$$
where $N$ is even number of phases and
$N \bmod (N/2 - 1) \neq 0$ Two phase assignments ($\Phi_{a,1}, \ldots \Phi_{a,N}$) and ($\Phi_{b,1}, \ldots \Phi_{b,N}$) are equivalent if $\Phi_{a,i}$=($\Phi_{b,i}$−1+p) mod N+1 for i=1 ... N and p is an arbitrary integer.

Examples of the above embodiment will be discussed in conjunction with FIGS. 9A and 9B, where N=the number of phases. The numbers inside the circles denote the input terminals (terminal number) of the multiphase transformer and the numbers outside the circles denote the assigned phases (phase number). Four examples are described below.

In FIG. 9A, N=5 phases. Phase 1 is assigned terminal 1.

The phase assigned to terminal 2 =

(1 − 1 + (5/2 − 1/2)) mod 5 + 1 = (2) mod 5 + 1 = 2 + 1 = 3

Thus, phase 3 is assigned to terminal 2.

The phase assigned to terminal 3 =

(3 − 1 + (5/2 − 1/2)) mod 5 + 1 = (4) mod 5 + 1 = 4 + 1 = 5

Thus, phase 5 is assigned to terminal 3

In FIG. 9B, N=12 phases. Phase 1 is assigned to terminal 1.

The phase assigned to terminal 2 =

(1 − 1 + (12/2 − 1)) mod 12 + 1 = (5) mod 12 + 1 = 5 + 1 = 6

Thus, phase 6 is assigned to terminal 2.

The phase assigned to terminal 3 =

(6 − 1 + (12/2 − 1)) mod 12 + 1 = (10) mod 12 + 1 = 10 + 1 = 11

Thus, phase 11 is assigned to terminal 3

One skilled in the art having the benefit of this description will appreciate how the embodiment above may be applied to the remaining input terminals of FIGS. 9A and 9B. Also, from the above examples, it will be appreciated how embodiments of the method may be applied to multiphase transformers having various numbers of phases.

In one embodiment, the number of phases assigned to the multiphase transformer in accordance with the above method is 16. Analysis shows that the use of 16 phases in a multiphase transformer having the cyclic cascade or modified cyclic cascade topology results in a converter efficiency of approximately 90%.

Figure 9C:
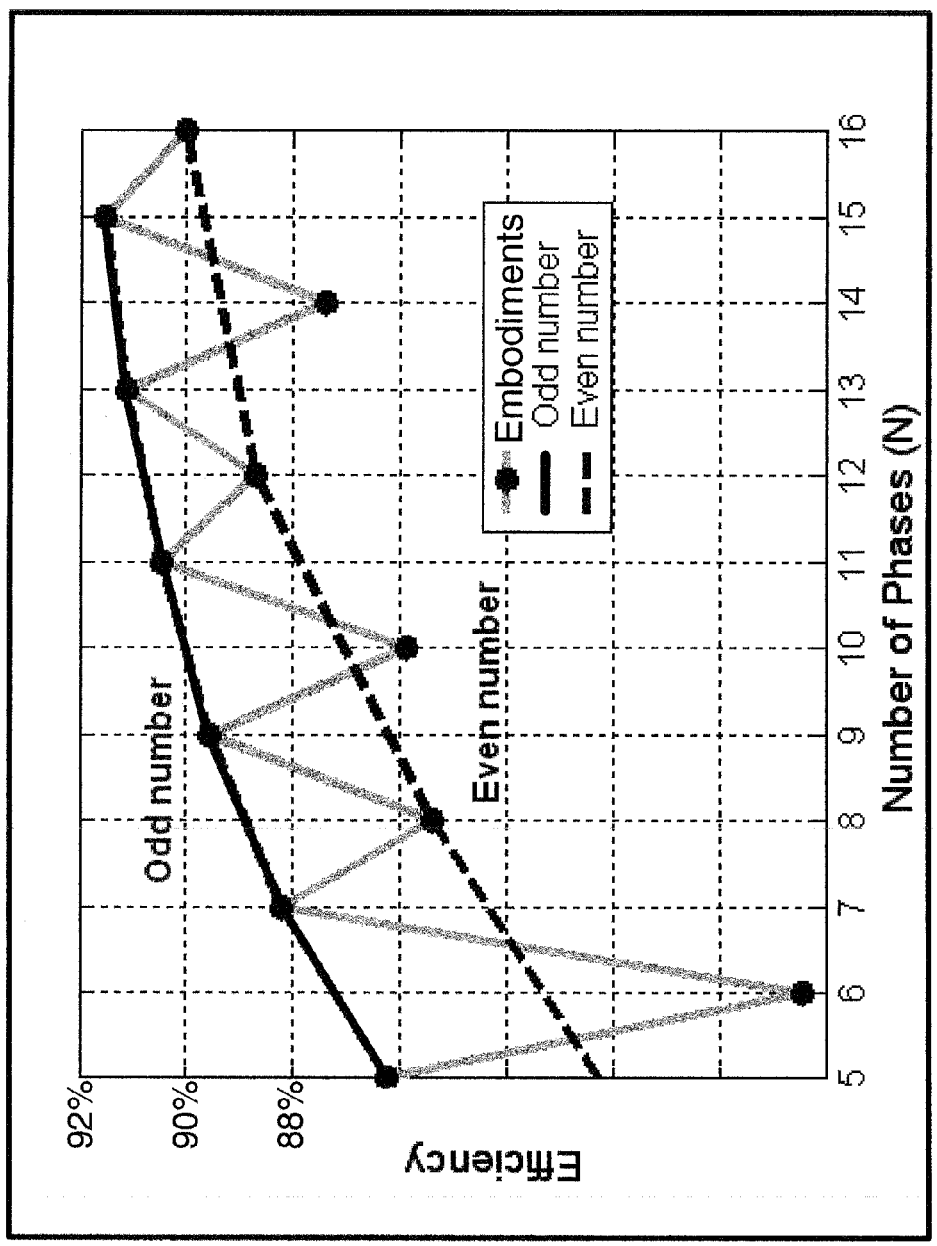
FIG. 9C is a graph illustrating the efficiency trend with different numbers of phases in accordance with embodiments of the present invention.

Referring to FIG. 9C, graph 950 illustrating the efficiency trend with different numbers of phases in accordance with embodiments of the present invention is shown. In graph 950, the vertical axis shows the efficiency of the DC-DC converter and the horizontal axis shows the number of phases N.

As shown in graph 950, the efficiency may increase with the number of phases N and may approach a maximum value of approximately 90% for N=16. An odd number of phases may provide a higher efficiency compared to embodiments with an even number of phases. Some even numbers of phases, such as, for example, 4, 6, 10, 14, and other numbers which may be a prime number multiplied by two, may conflict with the optimal phase assignment and may therefore result in lower efficiency.

It will be noted that DC-DC converters as described herein may be arrayed to deliver a higher total power to a larger load. In one embodiment, multiple DC-DC converters 500 designed for an output current of 5 A each may have their voltage outputs coupled in parallel. For example, in a dual-core processor each core may require a supply current of 20 A, and the cache memory and I/O (input/output) may consume a current of 5 A each. To supply this processor with current, ten DC-DC converters 500 may be used: four converters connected in parallel to supply the first core, another four converters connected in parallel to supply the second core, one converter to supply the cache memory, and one converter to supply I/O.

In one embodiment, the converters may be arranged in regular arrays (e.g., 2×5). The output voltages delivered to the two cores, the cache, and the I/O may be all different so as to operate each of these components under optimal conditions and to conserve power. For example, an idling core may be supplied with a lower voltage to reduce the leakage power loss.

Furthermore, two or three of the four converters supplying an idling core may be turned off in order to improve the efficiency at light load. The phase assignments between such converters may be optimized to minimize the input ripple current of each of the multiphase DC-DC converters and to minimize the residual output voltage ripple.

Figure 10:
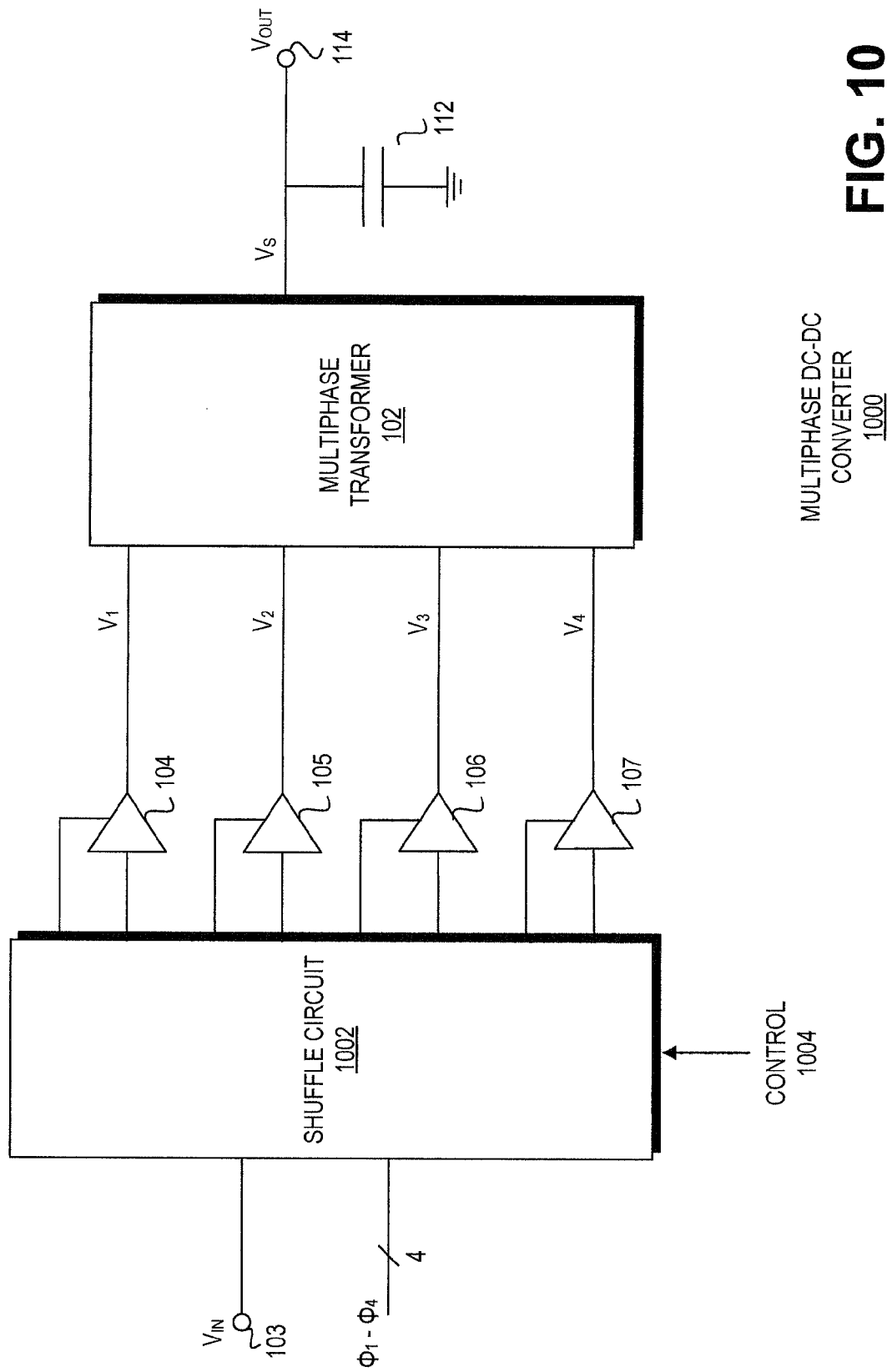
FIG. 10 is a block diagram illustrating a multiphase DC-DC converter in accordance with one embodiment of the present invention.

Referring to FIG. 10, a multiphase DC-DC converter 1000 having a programmable capability is shown. Multiphase DC-DC converter 1000 includes a shuffle circuit 1002 coupled to multiphase transformer 102. Input voltage $V_{IN}$ and phase assignments ($\Phi_1$-$\Phi_4$) are applied to shuffle circuit 1002. A control input 1004 is also applied to shuffle circuit 1002.

In one embodiment, shuffle circuit 1002 is used during fabrication of multiphase DC-DC converter 1000 to appoint the phases as desired to multiphase transformer 102. In one embodiment, control input 1004 is used to blow fuses within shuffle circuit 1002 so that phase assignments ($\Phi_1$-$\Phi_4$) are assigned to the voltage input terminals of the multiphase transformer as desired. In this particular embodiment, the phases are permanently assigned. Control input 1004 may be managed by a computer system, such as shown in FIG. 11B.

In another embodiment, control input 1004 may be used to change phase assignments to multiphase transformer 102 using hardware logic in shuffle circuit 1002. Thus, the assignment of phases may be changed in a deployed system. In one embodiment, the control input may be changed using a Basic Input/Output System (BIOS) setup utility of a computer system, such as shown in FIG. 11B.

Figure 11A:
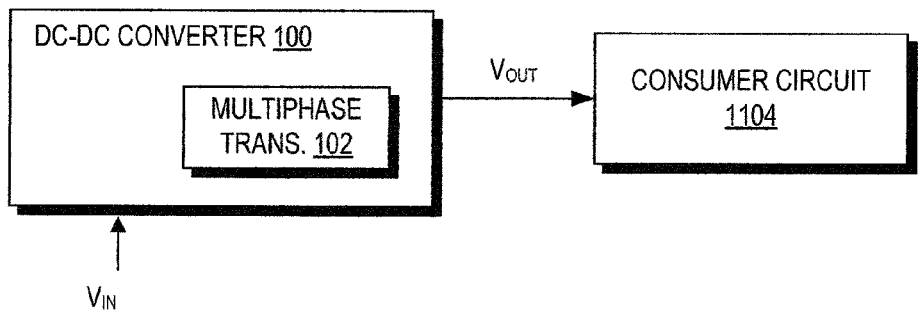
FIG. 11A is a block diagram illustrating a system having a multiphase DC-DC converter in accordance with one embodiment of the present invention.
Figure 11B:
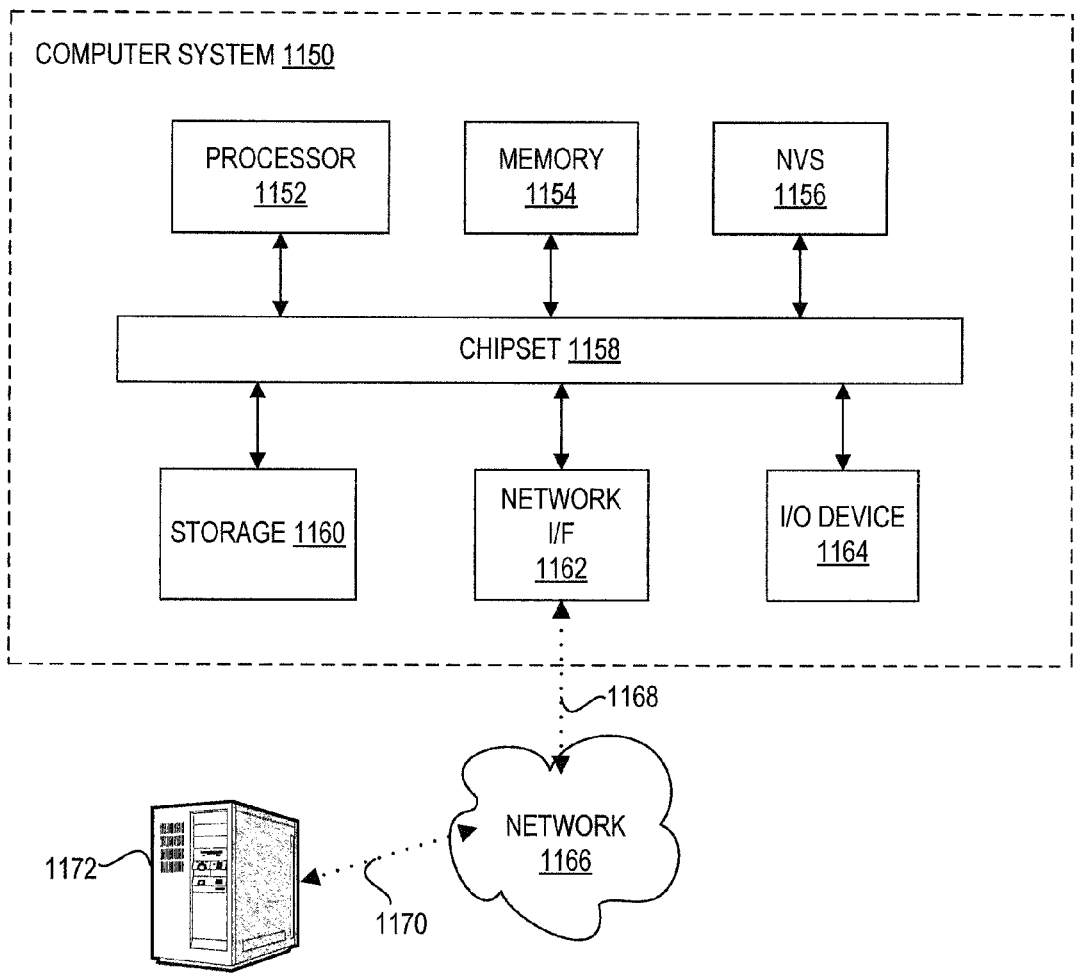
FIG. 11B is a block diagram illustrating a computer system in accordance with one embodiment of the present invention.

Referring to FIG. 11A, a system 1100 including multiphase DC-DC converter 100 is shown. In system 1100, the output voltage $V_{OUT}$ of multiphase DC-DC converter 100 is coupled to a consumer circuit 1104. Consumer circuit 1104 may also be referred to as a load. In one embodiment, consumer circuit 1104 includes a processor.

In one embodiment of system 1100, multiphase DC-DC converter 100 is an integrated on-die device in a package, and consumer circuit 1104 is separately packaged. In one embodiment, converter 100 and consumer 1104 are mounted to the same printed circuit board and electrically coupled together.

In another embodiment of system 1100, multiphase DC-DC converter 100 and consumer circuit 1104 are packaged in the same chip package. In one embodiment, converter 100 and circuit 1104 are integrated on the same die. In another embodiment, converter 100 and circuit 1104 are integrated on separate dies. In this particular embodiment converter 100 and circuit 1104 may be positioned side-by-side or stacked as in a multi-chip module.

FIG. 11B is an illustration of a computer system 1150 on which embodiments of the present invention may be implemented. Computer system 1150 includes a processor 1152 and a memory 1154 coupled to a chipset 1158. Storage 1158, Non-Volatile Storage (NVS) 1156, network interface (I/F) 1162, and Input/Output (I/O) device 1164 may also be coupled to chipset 1158. Embodiments of computer system 1150 include, but are not limited to, a desktop computer, a notebook computer, a server, a personal digital assistant a network workstation, or the like. In one embodiment, computer system 1150 includes a multiphase DC-DC converter as described herein to supply power to a consumer circuit of computer system 150, such as processor 1152.

Processor 1152 may include, but is not limited to, an Intel Corporation x86, Pentium®, Xeon®, or Itanium® family processor, or the like. In one embodiment, computer system 1150 may include multiple processors. In another embodiment, processor 1152 may include two or more processor cores.

Memory 1154 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 1154 may include one or more memory units that do not have to be refreshed.

Chipset 1158 may include a memory controller, such as a Memory Controller Hub (MCH), an input/output controller, such as an Input/Output Controller Hub (ICH), or the like. In an alternative embodiment, a memory controller for memory 1154 may reside in the same chip as processor 1152. Chipset 1158 may also include system clock support, power management support, audio support, graphics support, or the like. In one embodiment, chipset 1158 is coupled to a board that includes sockets for processor 1152 and memory 1154.

Components of computer system 1150 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 1164 may include a keyboard, a mouse, a display, a printer, a scanner, or the like.

Computer system 1150 may interface to external systems through network interface 1162. Network interface 1162 may include, but is not limited to, a modem, a Network Interface Card (NIC), or other interfaces for coupling a computer system to other computer systems. A carrier wave signal 1168 may be received/transmitted by network interface 1162. In the embodiment illustrated in FIG. 11B, carrier wave signal 1168 is used to interface computer system 1150 with a network 1166, such as a Local Area Network (LAN), a Wide Area Network (WAN), the Internet, or any combination thereof. In one embodiment, network 1166 is further coupled to a computer system 1172 by carrier wave signal 1170 such that computer system 1150 and computer system 1172 may communicate over network 1166.

Computer system 1150 also includes non-volatile storage 1156 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 1160 includes, but is not limited to, a magnetic disk drive, a magnetic tape drive, an optical disk drive, or the like. It is appreciated that instructions executable by processor 1152 may reside in storage 1160, memory 1154, non-volatile storage 1156, or may be transmitted or received via network interface 1162.

It will be appreciated that in one embodiment, computer system 1150 may execute Operating System (OS) software. For example, one embodiment of the present invention utilizes Microsoft Windows® as the operating system for computer system 1150. Other operating systems that may also be used with computer system 1150 include, but are not limited to, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes but is not limited to, recordable/non-recordable media (e.g., Read-Only Memory (ROM), Random Access Memory (RAM), magnetic disk storage media, optical storage media, a flash memory device, etc.). In addition, a machine-accessible medium may include propagated signals such as electrical, optical, acoustical or other forms of propagated signals (e.g., carrier waves, infrared signals, digital signals, etc.).

Various operations of embodiments of the present invention are described herein. These operations may be implemented by a machine using a processor, an Application Specific Integrated Circuit (ASIC), a Field Programmable Gate Array (FPGA), or the like. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

We claim:

1. A multiphase DC-DC converter comprising:
   a multiphase transformer having a plurality of input voltage terminals;
   shuffle circuitry coupled to the multiphase transformer, the shuffle circuitry:
   assign a first phase, to a first terminal of the plurality of input voltage terminals;
   assign a second phase, to a second terminal of the plurality of input voltage terminals if a total number of number of phases is odd;
   assign a third phase to the second terminal of the plurality of input voltage terminals if a total number of phases is even.

2. The multiphase DC-DC converter of claim 1 further comprises:
   an output voltage terminal coupled to another output voltage terminal of another multiphase DC-DC converter; and
   a capacitor coupled to the output voltage terminal.

3. The multiphase DC-DC converter of claim 2, wherein the other multiphase DC-DC converter is in parallel to the multiphase DC-DC converter.

4. The multiphase DC-DC converter of claim of 1, wherein the multiphase transformer is one of a:
   multiphase transformer with cyclic cascade topology;
   multiphase transformer with mixed cyclic cascade topology; or
   multiphase transformer with modified cyclic cascade topology.

5. The multiphase DC-DC converter of claim of 4, wherein the multiphase transformer with one of cyclic cascade topology, multiphase transformer with mixed cyclic cascade topology, and multiphase transformer with mixed cyclic cascade topology include two-phase transformers.

6. The multiphase DC-DC converter of claim of 5, wherein the two-phase transformers are arranged in at least two columns to reduce parasitic resistance between the two-phase transformers.

7. The multiphase DC-DC converter of claim of 4, wherein the cyclic cascade topology has an odd number of phases.

8. The multiphase DC-DC converter of claim of 4, wherein the mixed cyclic cascade topology has an even number of phases.

9. The multiphase DC-DC converter of claim of 4, wherein the modified cyclic cascade topology has an odd number of phases.

10. The multiphase DC-DC converter of claim 1, wherein the multiphase transformer comprises directly-coupled inductors with equal number of windings made on a common core.

11. The multiphase DC-DC converter of claim 10, wherein the directly-coupled inductors are integrated on a semiconductor die.

12. The multiphase DC-DC converter of claim 1, wherein the first, second, and third phases are applied with pulse width modulation (PWM).

13. An integrated circuit comprising:
    a processor having multiple processing cores; and
    a plurality of voltage regulators, each of which to provide a corresponding regulated power supply voltage to a corresponding processing core from among the multiple processing cores, wherein each voltage regulator comprises:
    a multiphase transformer having a plurality of input voltage terminals;
    shuffle circuitry coupled to the multiphase transformer, the shuffle circuitry:
    assign a first phase, to a first terminal of the plurality of input voltage terminals;
    assign a second phase, to a second terminal of the plurality of input voltage terminals if a total number of number of phases is odd;
    assign a third phase to the second terminal of the plurality of input voltage terminals if a total number of phases is even.

14. The integrated circuit of claim of 13, wherein the multiphase transformer is one of a:
    multiphase transformer with cyclic cascade topology;
    multiphase transformer with mixed cyclic cascade topology; or
    multiphase transformer with modified cyclic cascade topology.

15. A method, comprising:
    establishing a relationship between input phases and input terminals of a multi-phase transformer integrated on a semiconductor chip including:
    assigning a first phase to a first terminal of the plurality of input terminals;
    assigning a second phase to a second terminal of the plurality of input terminals if a total number of number of phases is odd;
    assigning a third phase to the second terminal of the plurality of input terminals if a total number of phases is even.

16. The method of claim 15 wherein the semiconductor chip includes a processing core and the multi-phase transformer is coupled to a power supply input of the processing core.

17. The method of claim 15 wherein the established relationship helps implement any of the following:
    a multiphase transformer with cyclic cascade topology;
    a multiphase transformer with mixed cyclic cascade topology;
    a multiphase transformer with modified cyclic cascade topology.

18. The method of claim 15 wherein the programmably establishing comprises blowing fuses within a shuffle circuit coupled between respective signal lines that transport the phases and the input terminals.

* * * * *